(12) United States Patent
Singhal

(10) Patent No.: US 6,615,244 B1
(45) Date of Patent: Sep. 2, 2003

(54) INTERNET BASED ARCHIVE SYSTEM FOR PERSONAL COMPUTERS

(76) Inventor: Tara C Singhal, P.O. Box 5075, Torrance, CA (US) 90510

( * ) Notice: Subject to any disclaimer, the term of this patent is extended or adjusted under 35 U.S.C. 154(b) by 0 days.

(21) Appl. No.: 09/200,677

(22) Filed: Nov. 28, 1998

(51) Int. Cl.[7] .............................................. G06F 15/167
(52) U.S. Cl. ........................ 709/213; 709/217; 709/227
(58) Field of Search ................................ 709/213, 217, 709/227

(56) References Cited

U.S. PATENT DOCUMENTS

| | | | |
|---|---|---|---|
| 5,146,561 A | 9/1992 | Carey et al. | |
| 5,355,472 A | 10/1994 | Lewis | |
| 5,402,474 A | 3/1995 | Miller et al. | |
| 5,515,502 A | 5/1996 | Wood | |
| 5,537,585 A | 7/1996 | Blickenstaff et al. | |
| 5,721,908 A | 2/1998 | Lagarde et al. | |
| 5,721,916 A | 2/1998 | Pardikar | |
| 5,727,129 A | 3/1998 | Barrett et al. | |
| 5,745,756 A | 4/1998 | Henley | |
| 5,761,663 A | 6/1998 | Lagarde et al. | |
| 5,764,972 A | 6/1998 | Crouse et al. | |
| 5,768,528 A | 6/1998 | Stumm | |
| 5,771,354 A | 6/1998 | Crawford | |
| 5,819,020 A | 10/1998 | Beeler, Jr. | |
| 5,832,522 A | 11/1998 | Blickenstaff et al. | |
| 5,832,523 A | 11/1998 | Kanai et al. | |
| 5,842,211 A | 11/1998 | Horadan et al. | |
| 5,842,222 A | 11/1998 | Lin et al. | |
| 5,850,442 A | 12/1998 | Muftic | |
| 6,091,411 A | * 7/2000 | Straub et al. | |
| 6,195,760 B1 | * 2/2001 | Chung et al. | 709/223 |
| 6,237,039 B1 | * 5/2001 | Perlman | |
| 6,272,545 B1 | * 8/2001 | Flanagin et al. | 709/201 |
| 6,311,232 B1 | * 10/2001 | Cagle et al. | 710/10 |

* cited by examiner

Primary Examiner—Frantz B. Jean

(57) ABSTRACT

An internet based archive system for personal computers comprising a personal computer, an internet connection to an archive server, and an archive server. The personal computer using an internet browser has functions enabling the personal computer for archiving data files from the personal computer to the archive server, and means enabling the internet connection to the archive server to be time shared in the background with other internet activity in the foreground.

18 Claims, 4 Drawing Sheets

◇   ARCHIVE SET UP FUNCTION    18

IP address of Archive Server
Username
Password
Data Encryption key

Disk
directory name1
directory name2
...
Disk
directory name1
directory name2

...

Backup levels – 1,3,5, 10

Figure 3

INTERNET BASED ARCHIVE SYSTEM FOR PERSONAL COMPUTERS

BACKGROUND

Before personal computers became common, people used main frame computers via a terminal. Then the task of back-up of computer data was in the hands of computer operators whose job was to back-up data on a regular basis. After personal computers (PC) came in wide use, it has been the responsibility of each PC user to create his or her own back-up using floppy disks.

On the whole personal computer users are not that meticulous or methodical and care to back-up their computer data on a regular basis. There are several reasons for that. One reason is the discipline required to do periodic back-ups. Second reason is that one has to label and store the back-up floppy disks. Third, it does take significant amount of time to create a back-up, time that could be spent on other pressing tasks. Fourth, there is no immediate urgency to create a back-up as a computer system or a computer system component crash and potential loss of data is a risk not well understood by an average PC user.

Therefore, it is an objective of the present invention, to eliminate for PC users the burden of having, labeling and storing floppy disks for the back-up of data.

Another objective of the present invention is to create an automatic back-up of PC user's data without the user taking any steps to create a back-up.

SUMMARY

An internet based archive system that will back-up a PC user's data files is disclosed. An archive server on the internet is used, whose exclusive function is to archive a PC user's data. Internet facilitates movement of data files from one computer to another computer. In this case from a personal computer to a dedicated archive server. The archive server has mass storage devices for the archival storage.

When a user connects to the internet and uses the internet for checking mail and surfing the web, that internet connection is utilized only when the browser makes a datafile request to a server on the internet and when the datafile is being received from a server. There are time gaps on the internet connection, when the connection is in an idle state on the line from the personal computer to the internet.

These idle states of time on the PC user's internet connection are used by a back-up software in the PC to effect an automatic back-up of data on PC's disk without the PC user taking any overt steps to create a back-up or even be aware that a behind the scene back-up is automatically taking place.

The PC based back-up software has four functions of Archive Setup function, Archive Review function, Automatic Back-up function, and Manual Backup function.

The Archive Setup function enables the user to set up the parameters for the archiving of his data on the archive server. These parameters are the internet protocol (IP) address of the server that has been assigned for his archival, user identification that uniquely identifies him to the archive server, password for user authentication, identification of the disk(s) and directories that are to be archived. In addition, preferably, the user can specify an encryption key for encoding his data for security and the level of archive, which specifies how many levels or versions of data to archive.

The Archive Review function allows the user to interact with the archive server for the purpose of status and retrieval of archived data. It permits a user to get a list of recently archived files or, a tree structure of all archived files or delete archived files or retrieve files. It also permits a user to get statistical data such as Mega Bytes of storage used, total number of files and most recent date of update etc.

The Manual Backup function allows the user to specify the files that should be archived.

The Archive Setup, Archive Review and Manual Backup functions are initiated by the user, when ever the user needs to set or change set up parameters, backup data and review the data that has been archived. The Automatic Back-up function, on the other hand is automatically initiated on establishing a connection to the internet via the browser.

The Automatic Backup function senses the idle state of the connection to the internet by reading the browser fields that indicate the use status. A prominent browser field is the icon on the top right of browser window which visually indicates that internet data transfer is in progress. Another browser field is at the bottom of the browser window which indicates the status of data transfer. The idle state of the internet connection also may be available from the PC operating system which tracks the idle time and if that exceeds a threshold cautions the user and terminates the connection.

The Automatic Backup function uses and manages that idle time in finite time increments. The Automatic Backup function collects the directory file names and their date/time stamp and sends them to the Archive Server. The Archive Server compares the data to the existing archive status and generates a file upload command for those files that have a changed date-time stamp. The Automatic Backup function receives the file upload command from the Archive Server and uploads those files to the Archive Server.

For the transfer of datafiles between the personal computer and the Archive Server, existing technology of file transfer protocol is used. This technology is in wide use and transfers data between computers efficiently and quickly by breaking the data in blocks and performs error checking and handshake for a successful datafile transfer.

The Archive Server function respond to the PC based Automatic and Manual Back-up function, Archive Setup function and Archive Review function.

DRAWINGS

These and other features, aspects and advantages of the present invention will become better understood with regard to the following description, appended claims and accompanying drawings where:

FIG. 3 shows a version of Archive Setup function;

DESCRIPTION

Figure 1A:
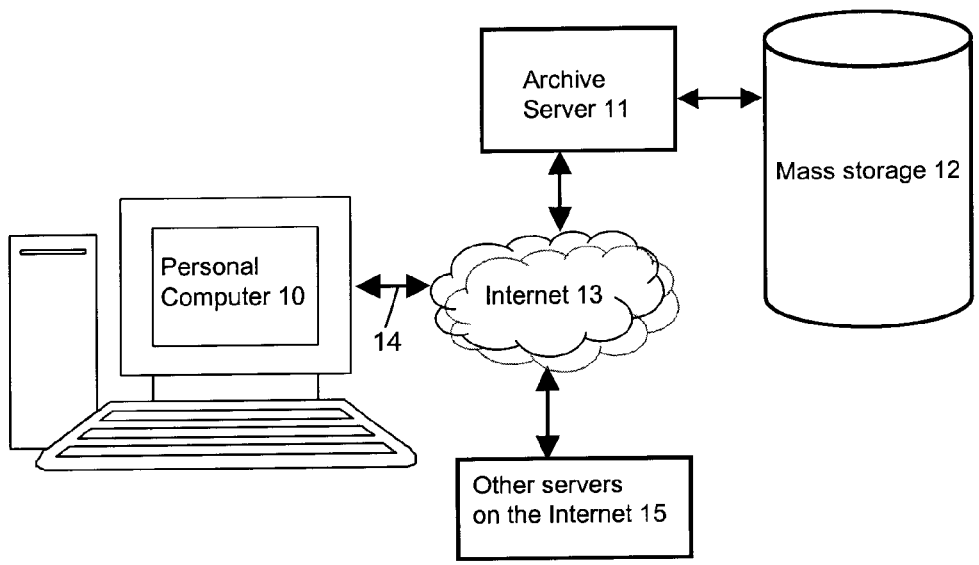
FIG. 1A shows a version of Internet Based Archive System for personal computers.
Figure 1B:
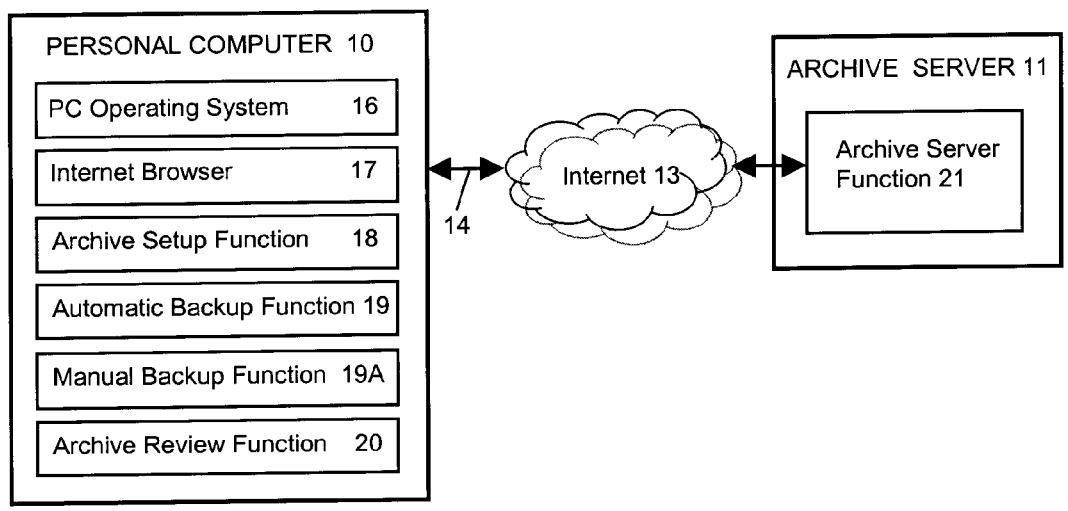
FIG. 1B shows a version of software functions in the Internet Based Archive System for personal computers.

With respect to FIGS. 1A and 1B, the Internet Based Archive System for personal computers has a personal computer (10) an internet connection (14) to the internet (13). On the internet there is an Archive Server (11) with mass storage means (12) as well as other servers on the internet (15).

The personal computer (10) has the software for an operating system (16), an Internet browser (17), and back-up software functions. The backup software functions are Archive Setup function (18), Automatic Backup function (19), Manual Backup function (19A), and Archive Review function (20). The Archive Server has the Archive Server function (21). The internet browser (17) in the personal computer connects (14) to the internet (13) and communicates to the Archive Server function (21).

Figure 2:
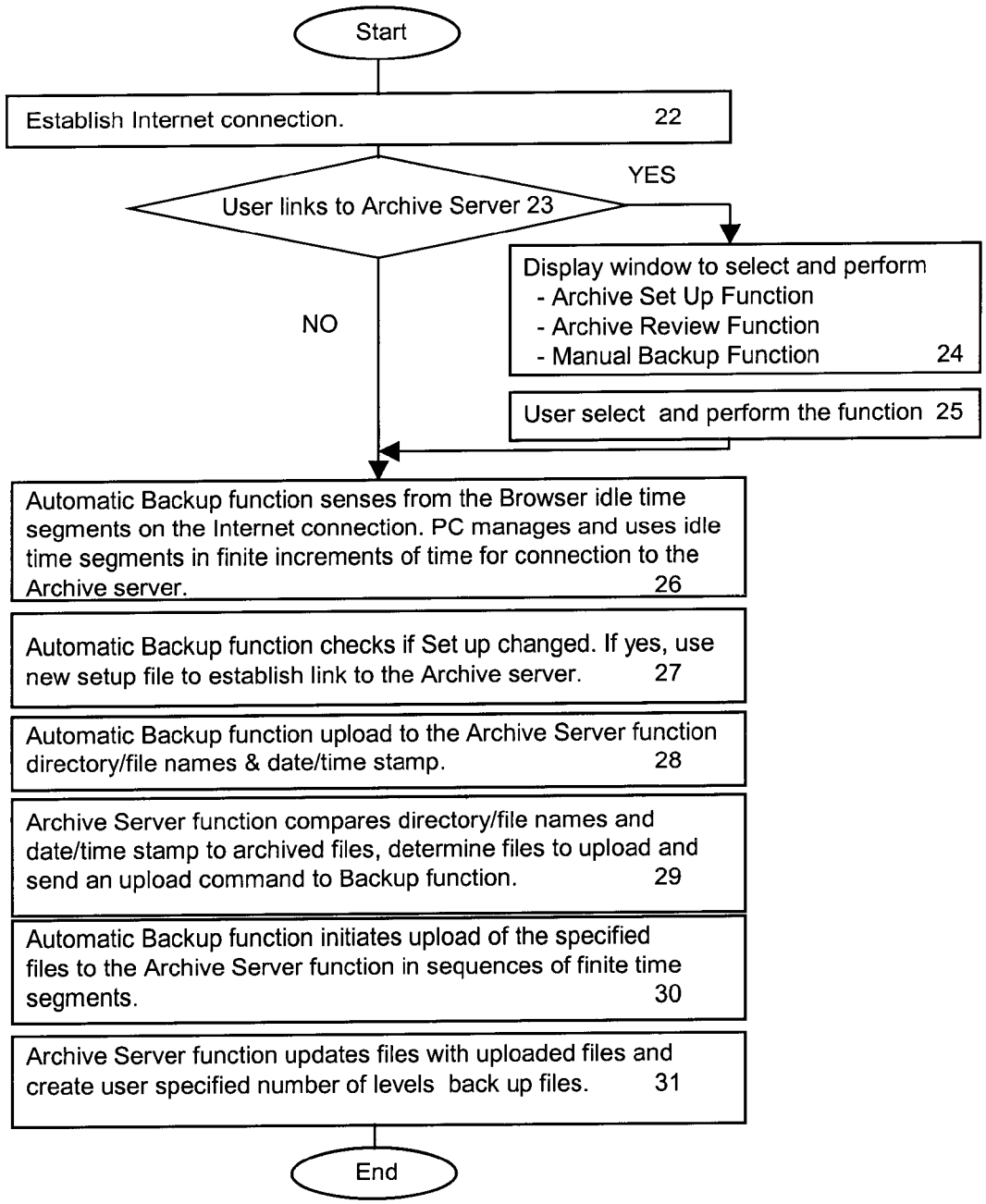
FIG. 2 shows a version of functional flow diagram of the Internet Based Archive System for personal computers.

With respect to FIG. 2, the Internet Based Archive System operates by first establishing a connection to the internet (22). Then the user has a choice to either create a link to the Archive Server or not (23). A user may create a link to the Archive Server for the purpose of either to perform the Archive Setup function or perform the Archive Review function or perform the Manual Backup function or any combination thereof.

If the user creates a link to the Archive Server, a display window enabling him to select one of the functions of Archive Setup, Archive Review or the Manual Backup is displayed (24). The user then selects and performs one of these functions (25).

With respect to FIG. 3, the Archive Setup function (18) enables the user to set up the parameters for the archiving of his data on the archive server. These parameters are the IP address of the archive server that has been assigned for his archival, user identification that uniquely identifies him to the archive server, password for user authentication, identification of the disk(s) and directories that are to be archived. In addition, preferably, the user can specify an encryption key for encoding his data for security and the back-up levels, which specifies how many levels or versions of data to archive.

Figure 4:
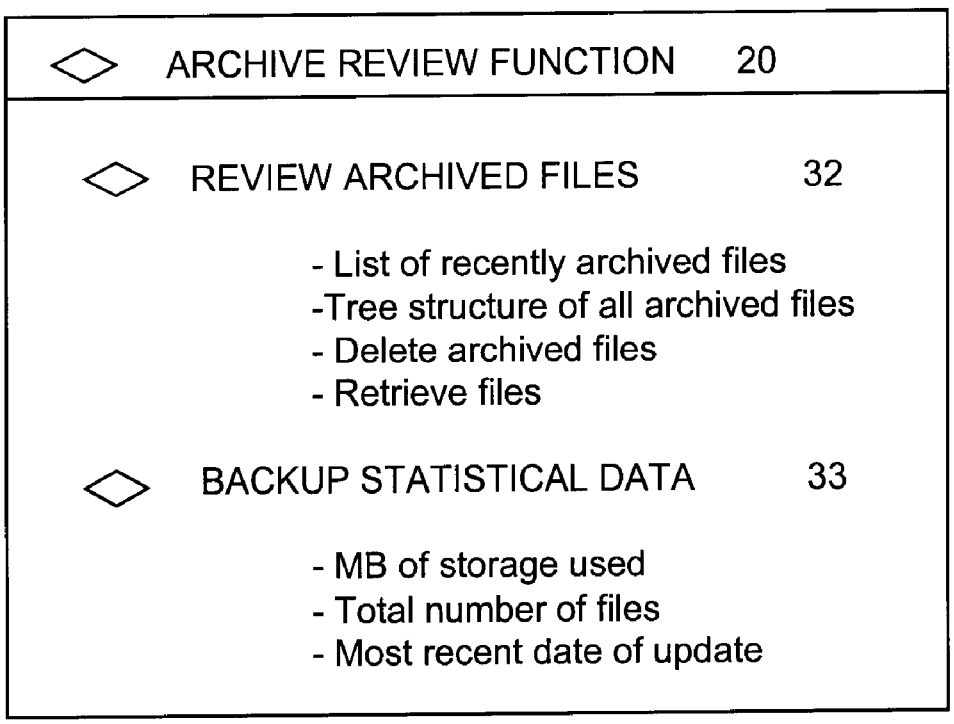
FIG. 4 shows a version of Archive Review function.

With respect to FIG. 4, the Archive Review function (20) allows the user to interact with the archive server for the purpose of status and retrieval of archived data. It permits a user to get a list of recently archived files or, a tree structure of all archived files or delete archived files or retrieve files (32). It also permits a user to get back-up statistical data such as Mega Bytes of storage used, total number of files and Most recent date of update etc. (33).

Figure 5:
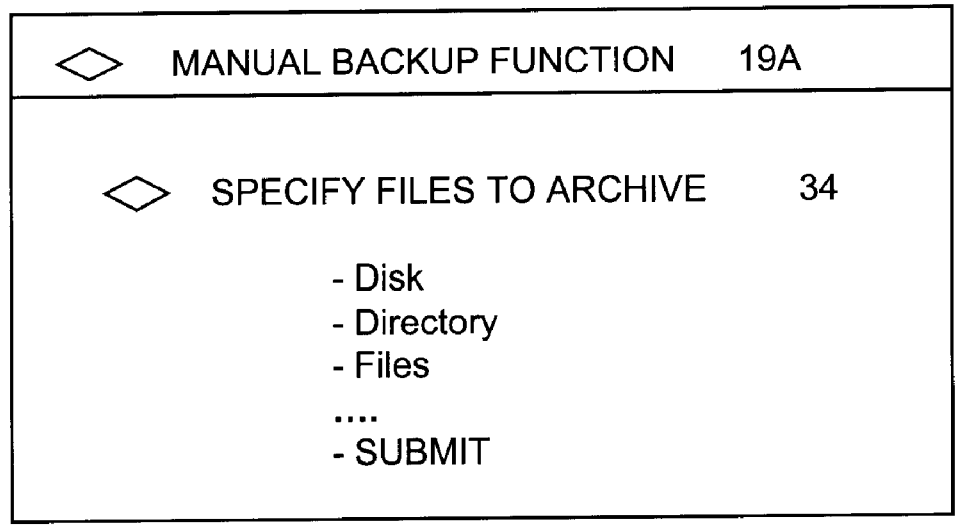
FIG. 5 shows a version of Manual Backup function.

With respect to FIG. 5, the Manual Backup function (19A) allows the user to specify the disk, directories and files for archiving (34).

Alternatively, the user may not link to the Archive Server and defaults to the Automatic Backup function. With respect to FIG. 2, the Automatic Backup function senses from the browser idle time segments on the internet connection. The Automatic Backup function manages and uses idle time segments in finite increments of time for connection to the Archive Server (26).

The Automatic Backup function senses the idle state of the connection to the internet by reading the browser fields that indicate the use status. A prominent browser field is the icon on the top right of browser window which visually indicates that internet data transfer is in progress. Another browser field is at the bottom of the browser window which indicates the status of data transfer. The idle state of the internet connection also may be available from the PC operating system which tracks the idle time and if that exceeds a threshold cautions the user and terminates the connection.

The Automatic Backup function checks if Setup changed. If yes, new Setup is used to establish link to the Archive Server (27). The Automatic Backup function collects the directory file names and their date-time stamp and sends them to the archive server (28).

The Archive Server function compares the directory/file names and date-time stamp to archived files and determines files to upload and sends an upload command to the Automatic Backup function (29). The Automatic backup function then initiates upload of the specified files to the Archive Server function in sequences of finite time segments (30). The Archive Server updates files with uploaded files and creates user specified number of levels for the back-up files. (31).

For the transfer of datafile between the personal computer and the archive server, the existing technology of file transfer protocol is used. This technology is in wide use and transfers data between computers efficiently and quickly by breaking the data in blocks with error checking and handshake between the computers for a successful datafile transfer.

In the preferred embodiment, at the time of first use a user will link to the Archive Server and perform the functions of Archive Setup, Manual Backup and Archive Review. Subsequent to first use, a user will default to Automatic Backup function. In all subsequent uses, the Automatic Backup function will back-up only those files that have changed since the previous use. Internet has assumed such wide popularity, that those who have internet account with an Internet Service Provider, regularly connect to the internet on a daily or weekly basis.

In other embodiment, a user may choose to perform Manual Backup, when he determines, his datafiles have changed significantly and should be backed up. That depends upon a user's personal habits and needs that how often he works on his computer and changes his files. To a user Automatic Backup and Manual Backup are available at the same time via the internet connection.

Although the present invention has been described in considerable detail with respect to certain preferred versions thereof, other versions are possible. Therefore, the spirit and scope of the appended claims should not be limited to the descriptions of the preferred versions contained herein.

Therefore, I claim:

1. A method of archiving data files from a client to an archive server, comprising the steps of:
   a. initiating, by the client, a connection to a global computer network and automatically activating only as an incident of this connection a back-up function in the client;
   b. creating, by the back-up function, a first data record having at least one file-name and date-stamp of the data file in the client, connecting to the archive server on the global computer network, and sending the first data record;
   c. receiving, by the archive server, the first data record, therein an archive server function comparing with files already present in the server, creating a second data record having at least one file-name and date-stamp of a data file not in the archive server, and sending the second data record to the client.

2. The method as in claim 1, comprising further steps of:
   a. receiving, by the client, the second data record and the back-up function queuing the files therein for transfer and sending to the archive server over the global computer network;
   b. receiving, by the archive server, the queued data files and archiving by the archive server function.

3. The method as in claim 2, comprising further step of:
   encrypting, by the back-up function, the named file data contents before queuing for transfer to the archive server on the global computer network.

4. The method as in claim 2, comprising further step of:

sensing idle times on the network connection between the client and the global computer network, by the back-up function, and sending the queued files to the archive server during the idle times.

5. The method as in claim 2, comprising further step of:

displaying, by the back-up function, a status indicator when the back-up function is active.

6. The method as in claim 2, comprising further step of:

archiving, by the archive server function, number of copies of the file identified by a file-name, equal to a back-up-level parameter being present in the archive server function.

7. A system of archiving data files from a client to an archive server, comprising:

a. a back-up function in the client, wherein the back-up function being activated automatically only as an incident of a global computer network connection by the client, assembling a first data record having at least one file-name and date-stamp of data file in the client, connecting to the archive server on the global computer network, and sending the first data record;

b. an archive server function in the archive server on receiving the first data record comparing with files already present in the archive server, creating a second data record having at least one file-name and date-stamp of data file not in the server, and sending the second data record to the client.

8. The system as in claim 7, further comprising:

a. the back-up function on receiving the second data record, queuing the files therein for transfer over the global computer network and sending to the archive server;

b. the archive server function, receiving the queued data files, and archiving the files.

9. The system as in claim 8, further comprising:

the back-up function sensing idle times on the network connection between the client and the global computer network, and sending the queued files to the archive server during the idle times.

10. The system as in claim as in 8, comprising:

the back-up function encrypting the named file data contents before queuing for transfer to the archive server on the global computer network.

11. The system as in claim 8, comprising:

the back-up function displaying a status indicator when the back-up function is active.

12. The system as in claim as in 8, further comprising:

the archive server function archiving number of copies of the file identified by a file-name equal to a back-up-level parameter being present in the archive server function.

13. A system of archiving data files from a client to an archive server, comprising:

a. client means, wherein the client means being activated automatically only as an incident of a global computer network connection by the client, assembling a first data record having at least one file-name and date stamp of data file in the client, connecting to the archive server on the global computer network, and sending the first data record;

b. server means receiving the first data record comparing with files already present in the archive server, creating a second data record having at least one file-name and date-stamp of data file not in the server, and sending the second data record to the client.

14. The system as in claim 13, further comprising:

a. the client means receiving the second data record, queuing the files therein for transfer over the global computer network and sending to the archive server;

b. the server means receiving the queued data files and archiving the files.

15. The system as in claim 14, further comprising:

the client means sensing idle times on the network connection between the client and the global computer network, and sending the queued files to the server during the idle times.

16. The system as in claim 14, comprising:

the client means encrypting the named file data contents before queuing for transfer to the archive server on the global computer network.

17. The system as in claim 14, comprising:

the client means displaying a status indicator when the client means are active.

18. The system as in claim 14, further comprising:

the server means archiving number of copies of the file identified by a file-name equal to a back-up-level parameter being present in the server means.

\* \* \* \* \*